United States Patent
Falkenberg et al.

(10) Patent No.: US 10,282,208 B2
(45) Date of Patent: May 7, 2019

(54) COGNITIVE THREAD MANAGEMENT IN A MULTI-THREADING APPLICATION SERVER ENVIRONMENT

(71) Applicant: INTERNATIONAL BUSINESS MACHINES CORPORATION, Armonk, NY (US)

(72) Inventors: Matthias Falkenberg, Stuttgart (DE); Thomas Steinheber, Stuttgart (DE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 105 days.

(21) Appl. No.: 15/649,831

(22) Filed: Jul. 14, 2017

(65) Prior Publication Data
US 2019/0018687 A1 Jan. 17, 2019

(51) Int. Cl.
*G06F 9/38* (2018.01)
*G06F 17/30* (2006.01)

(52) U.S. Cl.
CPC ........... *G06F 9/3851* (2013.01); *G06F 17/30* (2013.01)

(58) Field of Classification Search
CPC .................................................. G06F 9/3851
See application file for complete search history.

(56) References Cited

U.S. PATENT DOCUMENTS

| | | | |
|---|---|---|---|
| 8,935,698 B2 | 1/2015 | Busaba et al. | |
| 9,354,883 B2* | 5/2016 | Bradbury | G06F 9/3851 |
| 9,389,675 B2 | 7/2016 | Bose et al. | |
| 2012/0185709 A1 | 7/2012 | Weissmann et al. | |
| 2013/0191844 A1* | 7/2013 | Busaba | G06F 9/4856 |
| | | | 718/105 |
| 2014/0047451 A1 | 2/2014 | Archer et al. | |

OTHER PUBLICATIONS

Harkema et al., "Performance Comparison of Middleware Threading Strategies", International Symposium on Performance Evaluation of Computer and Communication Systems (SPECTS), 2004 (13 pages).

(Continued)

*Primary Examiner* — Charlie Sun
(74) *Attorney, Agent, or Firm* — Michael Petrocelli, Esq.; Kevin P. Radigan, Esq.; Heslin Rothenberg Farley & Mesiti P.C.

(57) ABSTRACT

Cognitive management of application request processing in a multi-threading application server environment is provided by, in part, obtaining multiple threads based on receiving multiple application execution requests, and determining whether to consolidate processing of at least two threads of the multiple threads based on one or more specified characteristics related to processing of the at least two threads. Based on determining to consolidate processing, the cognitive management approach includes pausing the at least two threads and generating a consolidated thread to determine a common result for the at least two paused threads. Thereafter, execution of the at least two threads is resumed using the common result provided by processing of the consolidated thread. In one embodiment, the at least two threads may be at least two request-level threads, while in another the threads may be at least two method-level threads.

20 Claims, 7 Drawing Sheets

(56) References Cited

OTHER PUBLICATIONS

Mel et al., "The NIST Definition of Cloud Computing," National Institute of Standards and Technology, Information Technology Laboratory, Special Publication 800-145, Sep. 2011, (pp. 1-7).

International Business Machines Corporation (IBM), "z/Architecture Principles of Operation," IBM® Publication No. SA22-7832-10, Eleventh Edition, Mar. 2015, pp. 1-1732.

International Business Machines Corporation (IBM), "Power ISA™ Version 2.07B," International Business Machines Corporation, Apr. 9, 2015, pp. 1-1527.

\* cited by examiner

COGNITIVE THREAD MANAGEMENT IN A MULTI-THREADING APPLICATION SERVER ENVIRONMENT

BACKGROUND

Aspects of the present invention relate, in general, to processing within a computing environment, and more particularly, to managing threads within a multi-threading application server environment, such as an enterprise middleware environment.

A thread typically exists within a process launched as the result of a request, such as an application request. A process may have multiple threads that share resources, such as memory. A thread is considered the smallest unit of processing that can be scheduled by an operating system. A thread can execute on a processor with no other threads executing thereon or on a processor with other threads. In the case where the thread is the only thread executing on the processor, the processor is said to be executing in single thread mode. However, in a case where the thread is executing with other threads, the processor is said to be in simultaneous multi-threading (SMT) mode.

In simultaneous multi-threading mode, hardware resources are shared among multiple software threads executing on a machine. Each thread appears to have its own complete set of architecture hardware. Although SMT provides an efficiency of hardware, allowing multiple threads to share resources available may result in a performance cost to the individual threads depending on the environment.

SUMMARY

Certain shortcomings of the prior art are overcome and additional advantages are provided through the provision of a computer program product for processing application execution requests in an application server environment. The computer program product includes a computer readable storage medium readable by a processing circuit and storing instructions which, when executed, perform a method. The method includes obtaining multiple threads based on receiving multiple application execution requests, and determining whether to consolidate processing of at least two threads of the multiple threads based on one or more specified characteristics related to processing of the at least two threads. Based on determining to consolidate processing, the method includes pausing the at least two threads and generating a consolidated thread to determine a common result for the at least two paused threads. Thereafter, execution of the at least two threads is resumed using the common result provided via the consolidated thread.

Systems and computer-implemented methods relating to one or more aspects are also described and claimed herein. Further, services relating to one or more aspects may also be described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description and the specific example(s), while indicating aspects of the invention, is given by way of illustration only, and not by way of limitation. Various substitutions, modifications, additions, and/or rearrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired by a particular application, for instance, for providing cognitive thread management in a multi-threading application server environment.

The illustrative embodiments may be described using specific code, designs, architectures, protocols, layouts, schematics, or tools only as examples, and are not limiting to the illustrative embodiments. Furthermore, the illustrative embodiments are described in some instances using particular software, tools, and data processing environments only as an example for clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

Figure 1:
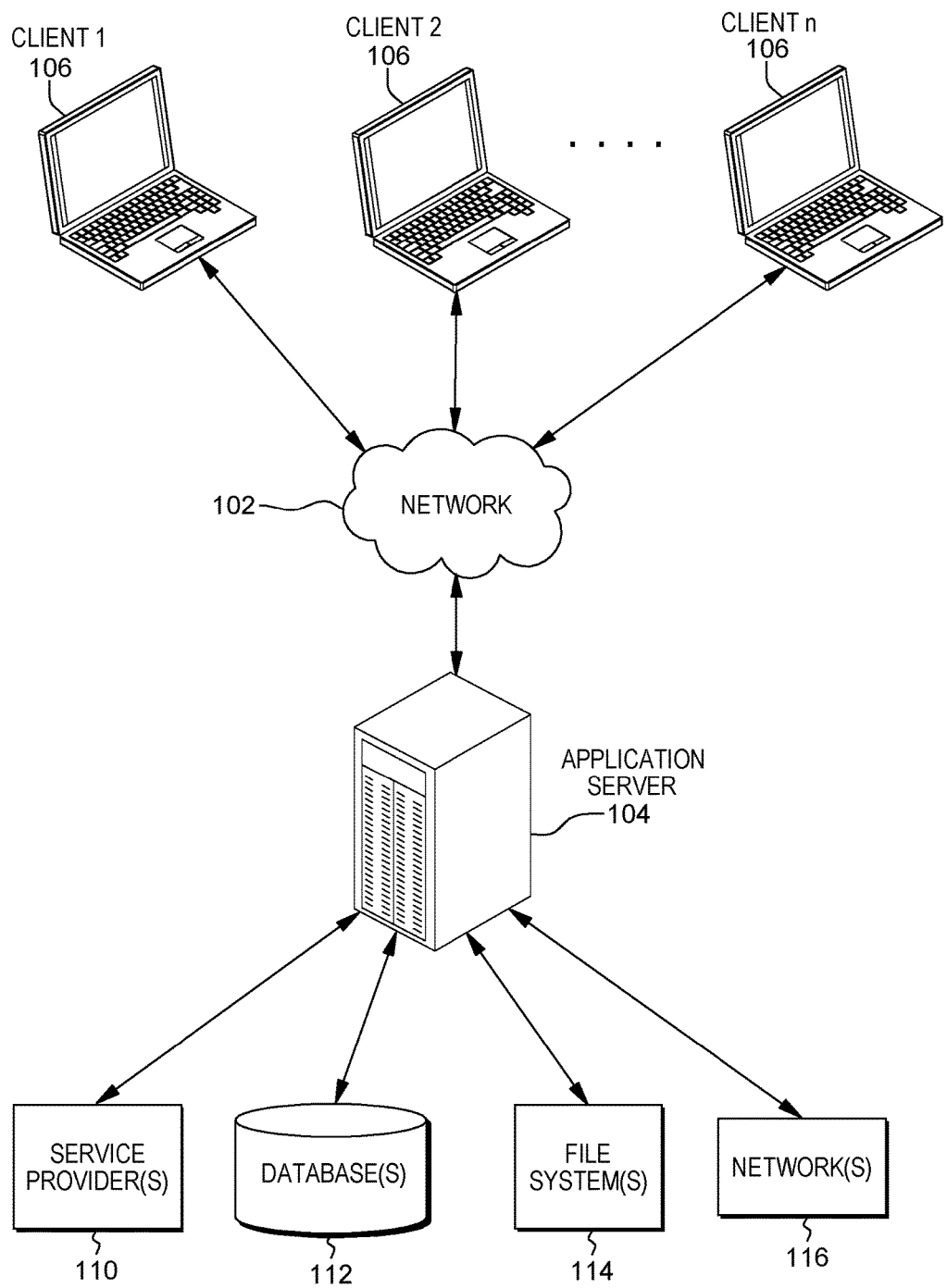
FIG. 1 depicts one embodiment of a computing environment to utilize cognitive thread management, in accordance with one or more aspects of the present invention.

As noted, multi-threading is widely used in many areas of computing. For instance, multi-threading is used in many enterprise middleware environments (such as in many application server environments) to facilitate making the enterprise middleware faster and more responsive to clients being served. FIG. 1 depicts a block diagram of one embodiment of a multi-threading application server environment, generally denoted 100, in which illustrative embodiments of the present invention may be implemented. Environment 100 includes a network 102, which may be the medium used to provided communication links between various devices and computers connected together within environment 100. Network 102 may include connections, such as wired connections, wireless communication links, fiber optics cables, etc. Server 104 is an example server coupled to network 102, as are clients 1, 2 . . . n 106. A data processing system, such as server 104 or clients 106, may contain data and may have software applications or software tools executing thereon.

As one example only, server 104 may be an application server, such as a web application server which serves clients, such as clients 1, 2 . . . n 106. Application server 104 may be one of a variety of application servers which may facilitate access to data from, for instance, one or more service providers 110, one or more databases 112, one or more filesystems 114 and/or one or more networks 116, etc. In one or more implementations, the application server 104 may behave like an extended virtual machine for running applications, transparently handling connections to one or more shared resources on one side, and often, connections to the web client on the other. The application server thus provides services to the web clients.

As noted, server(s) 104 and clients 1, 2 . . . n 106 may couple to network 102, along with other devices (not shown) using wired connections, wireless communications and protocols, and/or other suitable data connectivity. By way of example, clients 106 may be, for instance, personal computers, laptop computers, mobile devices, etc., and application server 104 may be any server based system, such as, for instance, a multi-threading enterprise middleware system. Environment 100 may include additional servers, clients and other devices that are not shown.

In the depicted example, environment 100 may include or be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including millions of commercial, governmental, educational, and other computer systems that route data and messages. Of course, environment 100 could also be implemented as any number of different types of networks, such as for example, an intranet, a local area network (LAN) a wide area network (WAN), etc. FIG. 1 is intended as one example only, and not as an architectural limitation for the different illustrative aspects and embodiments disclosed herein.

Among other uses, environment 100 may be used for implementing a client server environment, within which one or more illustrative embodiments of the present invention may be implemented. The client server environment enables applications, such as web-based applications, to distribute data across a network, such that an application may function by using the interactivity between a client data processing system and a server processing system. Environment 100 may also employ a service orientated architecture where interoperable software components distributed across a network may be bundled together as a coherent application, such as a coherent business application.

Figure 2:
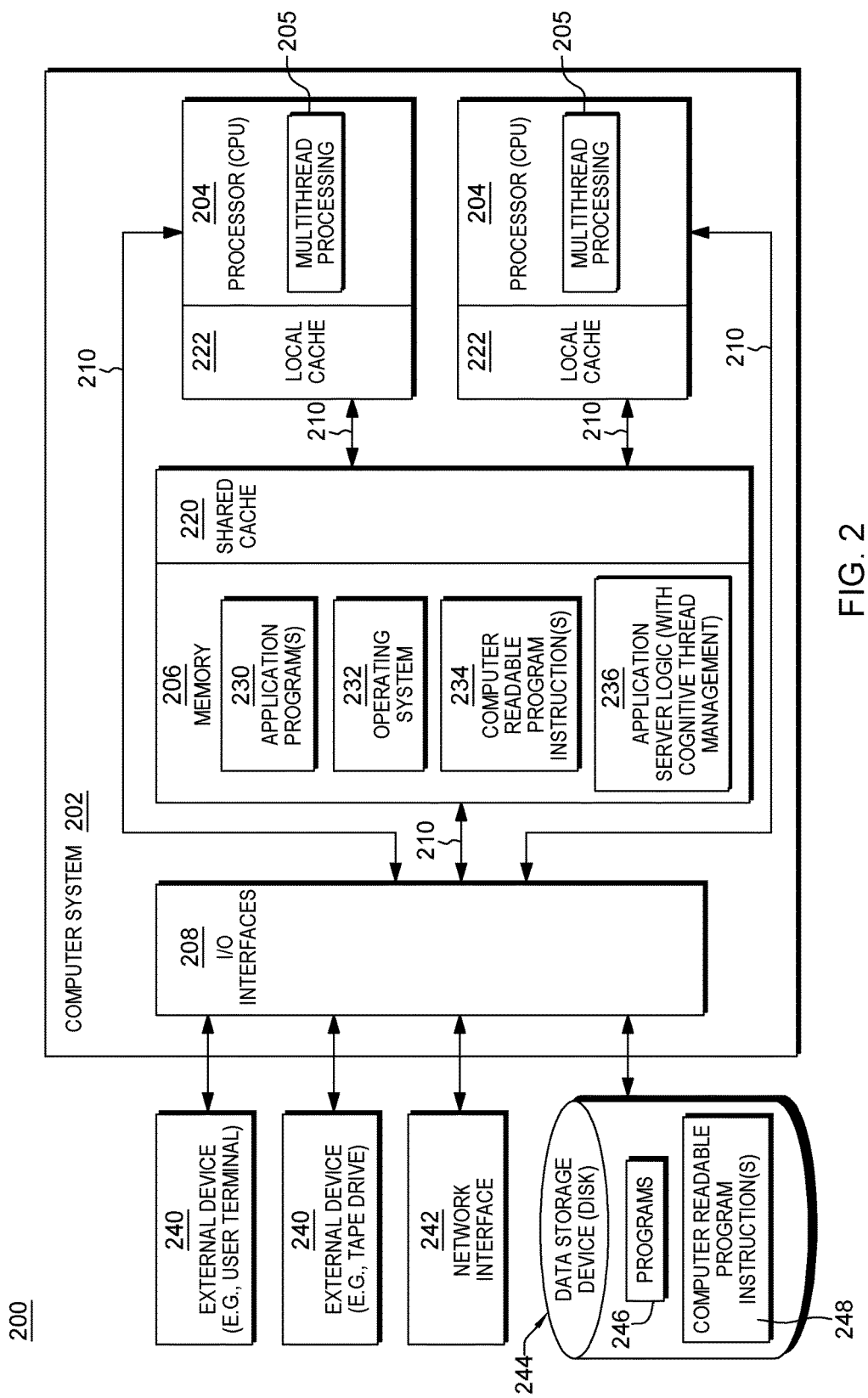
FIG. 2 depicts a block diagram of one embodiment of a data processing system which may implement processing, in accordance with one or more aspects of the present invention.

FIG. 2 depicts an example diagram of a data processing system or environment in which illustrative embodiments may be implemented or which may facilitate implementing illustrative embodiments. FIG. 2 is only an example and is not intended to assert or imply any limitation with regard to the environments in which different embodiments may be implemented. A particular implementation may make many modifications to the depicted environment based on the following description.

With reference to FIG. 2, and as noted, this figure depicts a block diagram of a data processing system in which one or more aspects of the present invention may be implemented, or which may facilitate implementing one or more aspects of the present invention. Data processing system 200 is an example of a computer, such as server, or other type of device, in which computer usable program code or instructions implementing one or more processes may be located for the illustrative embodiments.

In one example, data processing system 200 may be based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. z/ARCHITECTURE® is a registered trademark of International Business Machines Corporation, Armonk, N.Y., USA.

In another example, the processing system may be based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE® is a registered trademark of International Business Machines Corporation, Armonk, N.Y., USA.

The data processing system may also be based on other architectures, including, but not limited to, the Intel x86 architectures. Other examples also exist.

As shown in FIG. 2, data processing system 200 includes, for instance, a computer system 202 shown, e.g., in the form of a general-purpose computing device. Computer system 202 may include, but is not limited to, one or more processors or processing units 204 (e.g., central processing units (CPUs)), a memory 206 (referred to as main memory or storage, as examples), and one or more input/output (I/O) interfaces 208, coupled to one another via one or more buses and/or other connections 210.

Processor 204 includes a plurality of functional components used to execute instructions. These functional components include, for instance, an instruction fetch component to fetch instructions to be executed; an instruction decode unit to decode the fetched instructions and to obtain operands of the decoded instructions; instruction execution components to execute the decoded instructions; a memory access component to access memory for instruction execution, if necessary; and a write back component to provide the results of the executed instructions.

In addition, processor 204 includes, in one or more embodiments, a multi-thread processing capability 205 supporting processing of multiple threads in parallel.

Bus 210 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 206 may include, for instance, a cache 220, such as a shared cache, which may be coupled to local caches 222 of processors 204. Further, memory 206 may include one or more programs or applications 230, an operating system 232, and one or more computer readable program instructions 234, as well as application server processing logic 236, with cognitive thread management such as disclosed herein. Additionally, or alternatively computer readable program instructions 234 may be configured to carry out one or more other functions of certain embodiments of the invention.

Computer system 202 may also communicate via, e.g., I/O interfaces 208 with one or more external devices 240, one or more network interfaces 242, and/or one or more data storage devices 244. Example external devices include a user terminal, a tape drive, a pointing device, a display, etc. Network interface 242 enables computer system 202 to communicate with one or more networks, such as a local area network (LAN), a general wide area network (WAN), and/or a public network (e.g., the Internet), providing communication with other computing devices or systems.

Data storage device 244 may store one or more programs 246, one or more computer readable program instructions 248, and/or data, etc. The computer readable program instructions may be configured to carry out functions of one or more aspects of the present invention.

Computer system 202 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 202. Examples, include, but are not limited to: microcode, device drivers, redundant processing units, external disk drive arrays, RAID systems, tape drives, and data archival storage systems, etc.

Computer system 202 may be operational with numerous other general purpose or special purpose computing system environments or configurations. Examples of well-known computing systems, environments, and/or configurations that may be suitable for use with computer system 202 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As noted, the depicted example in FIG. 2, and discussed above, is not meant to imply architectural limitations. For instance, data processing system 200 of FIG. 2 could also be a server, workstation, tablet computer, laptop computer, or other device.

Further, the hardware embodiments depicted in FIGS. 1-2 may vary depending on the desired implementation. Other internal hardware or peripheral devices, such as flash memory, equivalent nonvolatile memory, optical disk devices, and the like, may be used in addition to or in place of certain hardware depicted in FIGS. 1-2. Also, the processes of the illustrated aspects described herein may be applied to other hardware environments.

As noted above with respect to FIG. 1, a multi-threading application server environment may be used in implementing a web application. As known, a web application is a client-server software application in which the client (or user interface) typically runs in a web browser. The server application, or web application, may at any time be servicing a large number of clients. Common web applications include webmail, online retail sales, online auctions, instant messaging services, video on demand services, and many other functions.

In one or more implementations, an application server may use a thread (e.g., a thread $T_1$) to process a first application execution request. If the application server receives a second application execution request, the application server may start computing a response right away using another application thread (e.g., thread $T_2$). A third application execution request may be processed using a third thread $T_3$, etc. Thus, multi-threading in this context allows the application server to process more than one client request concurrently, or in parallel. Conceptually, threads are discussed herein at multiple levels. For instance, request-level threads and method-level threads are discussed. In one or more embodiments, a client request (or application execution request) may spawn, or result in one or more request-level threads, and a request-level thread may spawn, or result in, multiple method-level threads, with the method-level threads being at (for instance) the web application level in one or more aspects. Although multi-threading has many advantages, multi-threading may also produce difficulties.

For instance, processing multiple requests concurrently, or in parallel, can require a synchronization capability if the threads require the same resource(s), such as a same database, filesystem, network, service provider, etc. Threads that compete for resources can block each other. For example, one or more threads may have to wait on another thread to release a required resource before they can resume their processing.

More particularly, and by way of example only, an application server may run a web application that retrieves and visualizes data from a database. The application server may spawn one or more new threads for each incoming application execution request. After a while, the database management system may be under a significant load such that it cannot process and respond to all database queries immediately. That is, in certain web applications, threads may have to remain in a waiting state until the database has completed processing previously received database queries. An example of this may be a web application server implementing video on demand.

Disclosed herein are a computer program product, system and method implementing cognitive thread management for a multi-threading application server environment. The cognitive thread management utilizes selective (i.e., rule-based) consolidating of threads to improve response times where possible and appropriate. For example, multiple threads $T_{1...n}$ that satisfy specific characteristics related to the threads or related to processing of the threads may be paused and a new, consolidated thread $T_c$ may be created to determine a common result for the paused threads. Once the consolidated thread $T_c$ completes, the paused threads $T_{1...n}$ may be resumed using the common result of the processing the consolidated thread $T_c$.

In one or more implementations, the cognitive thread management facility disclosed herein facilitates processing of application execution requests by, for instance, obtaining multiple threads based on receiving one or more application execution requests, and determining whether to consolidate processing of at least two threads of the multiple threads. The determining is based on one or more specified characteristics related to processing of the at least two threads. Based on determining to consolidate processing, the management facility pauses the at least two threads and generates a consolidated thread to determine a common result for the at least two paused threads. Once the common result is obtained, execution of at least two threads is resumed using the common result obtained via the consolidated thread.

In one or more embodiments, the multiple threads include multiple request-level threads, and the consolidated thread is a consolidated request-level thread to determine a result for at least two paused request-level threads. In one or more other embodiments, the multiple threads may include multiple method-level threads, and the consolidated thread may be a consolidated method-level thread to determine a result for the at least two paused method-level threads, where based on receiving multiple application execution requests, multiple request-level threads are generated, each request-level thread spawning, for instance, one or more method-level threads.

In one or more embodiments, the determining whether to consolidate processing of at least two threads may include evaluating, by a cognitive thread analyzer, a respective thread consolidation context for each thread of the at least two threads. The respective thread consolidation context may be augmented based on historical thread consolidation information, which may change overtime, as described herein. Further, determining whether to consolidate processing of the at least two threads may include, for instance, determining that the at least two threads will have a lower mean response time by being paused and consolidated using the consolidated thread. In an alternate implementation, thread consolidation could be, for example, occurring to reduce the number of calls to a backend server, such as a database. Determining whether to consolidate processing of at least two threads could include either consolidation goal, or one or more other goals, depending upon the implementation.

By way of example, the determining whether to consolidate may include analyzing the nature of at least two request-level threads, and based on the nature of the at least two request-level threads, identifying related performance and resource usage parameters, for instance, from a knowledge store database including historical thread consolidation-related information. Alternatively, characteristics may be captured in the initial thread consolidation context. That is, the information to be considered may be obtained from other than the knowledge store. Processing then compares the identified performance and resource usage parameters against one or more applicable consolidation rules, for instance, from a policy store database, for use in deciding whether to consolidate the at least two request-level threads.

To dynamically identify threads to be consolidated, a cognitive run-time intelligence mechanism, including a cognitive thread analyzer and a thread consolidation engine, may be utilized as described herein. The decision logic of the cognitive thread management facility may be implemented in a fashion that is dynamic, and learns over time based on continuing run-time and resource allocation monitoring. Advantageously, the cognitive thread management facility disclosed herein may be utilized to limit, or even avoid, thread deadlocks. In a specific embodiment of the method-level processing, the implementation may be based on method level instrumentation of code.

Figure 3:
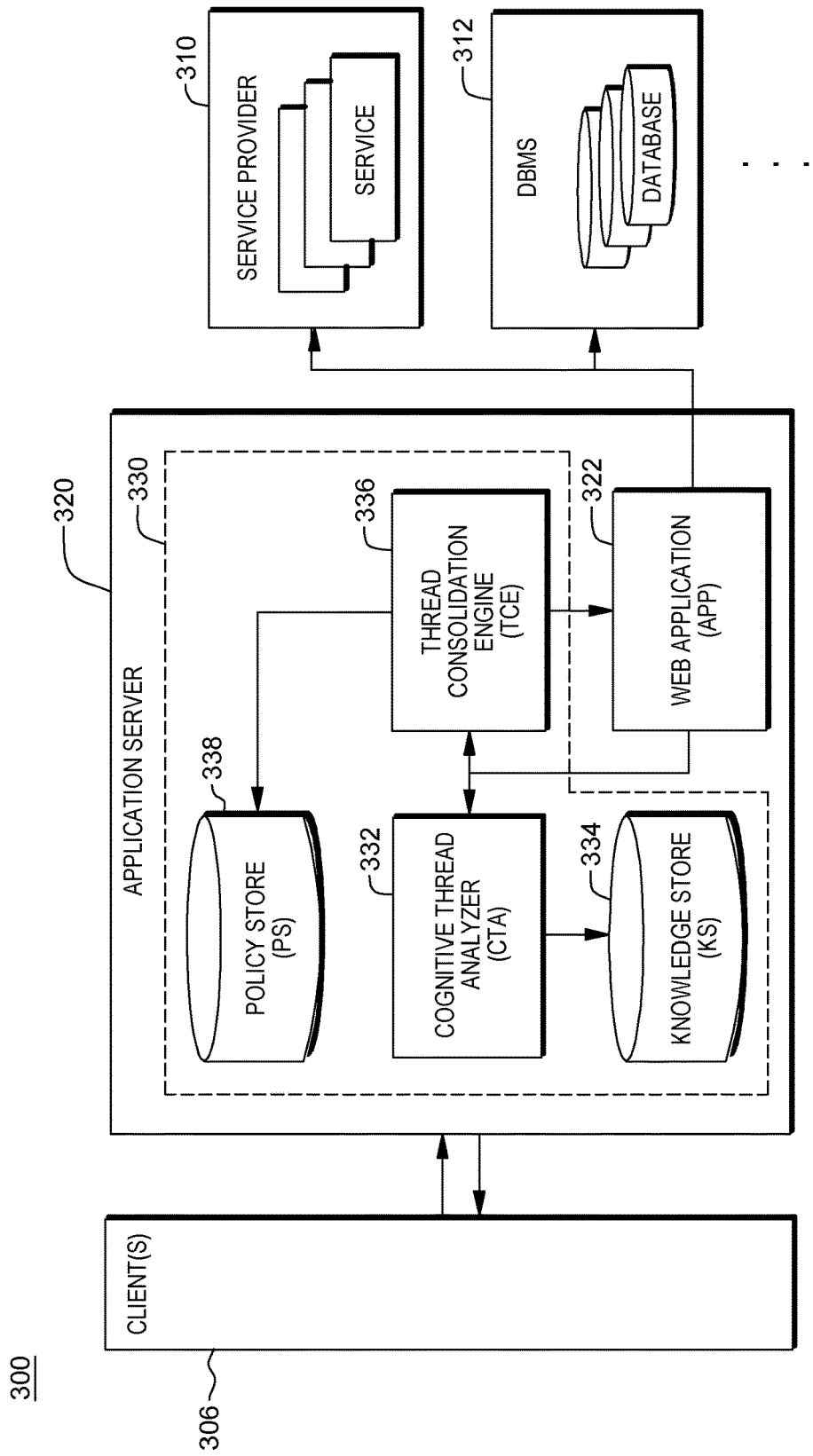
FIG. 3 is a block diagram of a computing environment implementing cognitive thread management, in accordance with one or more aspects of the present invention.

FIG. 3 depicts one embodiment of a multi-threading application server environment 300 which utilizes cognitive thread management, in accordance with one or more aspects of the present invention. As illustrated, one or more clients 306 access a web application 322 of an application server 320, in order to, for instance, obtain desired content from one or more service providers 310, one or more database management systems 312, etc. Application server 320 hosting web application 322 further includes a cognitive thread management facility 330, in accordance with one or more aspects of the present invention. As illustrated, cognitive thread management facility 330 includes a cognitive thread analyzer (CTA) 332, a knowledge store (KS) database 334, a thread consolidation engine (TCE) 336, and a policy store (PS) database 338. Each of these components is discussed further below.

Cognitive thread analyzer (CTA) 332 is a component of cognitive thread management facility 330 which understands and learns about resources required to respond to an application execution request received from client(s) 306. At request level threads, the cognitive thread analyzer learns about characteristics of responses from prior application requests. For instance, upon receiving an application execution request, the application server 320 may route the request through cognitive thread analyzer 332, which analyzes the nature of the request and identifies key performance (e.g., response times) and resource usage parameters from knowledge store (KS) database 334 to facilitate checking the request against one or more consolidation rules in the policy store (PS) database 338. The thread consolidation engine 336 is the component which decides whether a thread qualifies for consolidation based, at least in part, on the cognitive thread analyzer processing.

As noted, the cognitive management facility disclosed herein may also implement method level consolidation of threads. In such case, the cognitive thread analyzer 332 may be involved in the processing within an application, that is, below the request-level thread. As noted, a request-level thread may generate multiple method-level threads to accomplish processing of the request. In one or more embodiments, these method level threads may be generated by the web application 322, and be in one or more examples, sub-processes required to implement a particular request-level thread. In one or more implementations, there may be multiple options for method-level thread analysis. For instance, the cognitive thread analyzer 332 may use method-level instrumentation to learn about key areas of an application that are suited as thread consolidation points. For example, retrieving an image from a database may be a desired result for a method-level thread, and multiple such method-level threads may possibly be consolidated where the threads are retrieving the same image. In another implementation, application developers could annotate the web application code to specify possible thread consolidation points at the method level.

For each request-level thread, the cognitive thread analyzer 332 may generate a thread consolidation request context. Initially, the request context may include, for instance, HTTP request headers (e.g., Accept-Language, Cookie, User-Agent), and query parameters of the request. More generally, the information added to the context could be specified in the application server setup and/or in the web application. Using the knowledge store database 334, the cognitive thread analyzer 332 matches the context against what is already known in the knowledge store database. The context may be augmented with information from the KS database 334, such as resource usage for request processing, response times (e.g., minimum response time, maximum response time, average response time, etc.).

For method-level thread consolidation, the cognitive thread analyzer may create a thread consolidation method context. Initially, such a method context may include, for example, a method signature, as well as method arguments passed by a process caller of the method. Using the knowledge store database 334, the cognitive thread analyzer 332 may match the method context against what is already known in the database. The method context may be similarly augmented with information such as resource usage for the method-level request processing, response times (e.g., minimum response time, maximum response time, average response time, etc.) for similar method-level requests, etc.

In one or more embodiments, the knowledge store database 334 may contain historical data about application-level requests and method-level requests. To store information on requests and methods, the cognitive thread analyzer 332 writes data to the knowledge store database 334. By way of example, information on typical request patterns and resource usage patterns may be stored in the knowledge store database 334 to optimize further thread consolidation processes. To augment a thread consolidation context, the cognitive thread analyzer 332 may read data from the knowledge store database 334. Note that the data in the knowledge store may be stored with different levels of abstraction. An organization in data clusters and hierarchies may also be considered. In one or more implementations, the knowledge store database may operate as a historical thread consolidation database containing, at least in part, historical thread consolidation requests contexts.

Once cognitive thread analyzer 332 creates a complete thread consolidation context, the analyzer passes the context through to thread consolidation engine 336. Thread consolidation engine 336 may check the policy store (PS) database 338 for a best matching thread consolidation policy (e.g., a best matching thread consolidation rule). If the thread qualifies for thread consolidation, the thread is paused, and thread consolidation engine 336 continues to gather additional threads with a context matching the paused thread. In one or more implementations, the context should be an exact match for the parts that are picked up from the request (for example, request header) or method (for example, arguments received by the method). Flexibility may come from the configuration that specifies the aspects contributing to the context, as discussed above. Note also that the parts that are augmented based on historical data are not relevant for the comparison. These parts may be excluded from the comparison. The format of the comparison for matching may be an implementation detail. Based on a thread consolidation threshold being reached, or a waiting time threshold being reached, the thread consolidation engine creates a consolidated thread (or a consolidation thread), which determines a common result for all of the paused threads with the matching context. The specified threshold(s) for proceeding with processing of the consolidated thread are considered part of the cognitive approach disclosed herein. Note also that the information provided as the thread consolidation context by the cognitive thread analyzer 332 is not static, but may dynamically change over time. In one or more implementations, the thread consolidation engine optimizes thread processing so that the number of threads that are consolidated have a lower mean response time despite the fact that one or more of the threads may be paused while the thread consolidation engine waits for additional threads to be received that match the specific context of the paused thread. This optimization may consider, for example, historical request patterns, including (for instance) at a given time of day, a given day of the week, or even a given week of the year. An alternative goal of thread consolidation could be, for instance, to reduce the number of calls to a backend server, such as a database. This could be useful if, for instance, the number of backend server requests is limited or incurs costs.

As noted, policy store (PS) database 338 contains rules for the consolidation of threads based on specific characteristics of request and method calls. For instance, a thread consolidation policy or rule can define that a thread can only be consolidated if one or more conditions are met. For instance, a thread may be consolidated if the thread produces a response with only public data, or there are at least three threads to consolidate, or the ratio between the average processing time of the thread and the waiting time to be consolidated is above 10:1. Those skilled in the art will note that other policies may be provided and stored in the policy store database depending on the implementation. In general, the policy store database 338 contains thread consolidation policies, which are consolidation rules that determine the parameters for consolidating one thread with other threads, based on the resource consumption parameters, additional resource consumption parameters, and expected performance parameters. As noted, the rules may be request-level based or method-level based.

Figure 4:
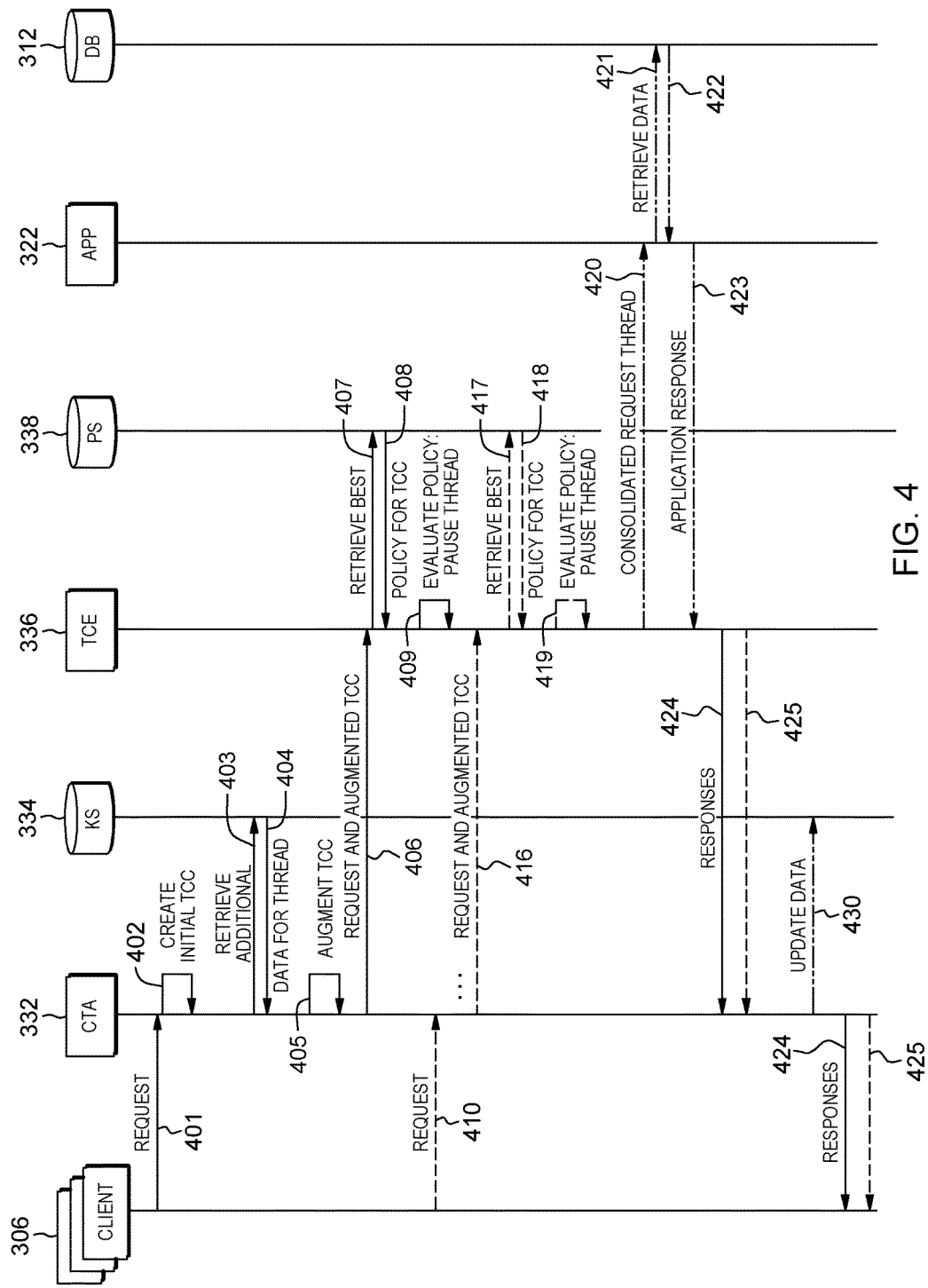
FIG. 4 depicts one embodiment of a cognitive thread management process, in accordance with one or more aspects of the present invention.

FIG. 4 depicts a sample processing sequence of request-level threads which undergo consolidation by a cognitive thread management facility such as disclosed herein. As illustrated, a client 306 may send an application execution request 401 to the application server, which is passed to the cognitive thread analyzer (CTA) 332. The cognitive thread analyzer 332 creates an initial thread consolidation context (TCC) 402, which in this example is a thread consolidation request context. As noted, the cognitive thread analyzer 332 has information about the request, such as where the request originates, a preferred language for the response, as well as information on the response, such as what part of a web application the request is directed to, etc. The cognitive thread analyzer 332 references 403 the knowledge store database 334 to obtain additional data for the request thread 404. The additional data is used to augment the thread consolidation context (TCC) 405, and the request and augmented TCC 406 are forwarded by cognitive thread analyzer 332 to thread consolidation engine 336. Thread consolidation engine 336 obtains a best matching policy (or rule) for the thread consolidation context by referencing 407 the policy store database 338, with the best policy being returned 408 from policy store database 338 to thread consolidation engine 336. The thread consolidation engine evaluates the policy, and in this example, determines to pause the request-level thread 409.

Similar processing steps occur for a second application execution request 410 from, for instance, a second client 306. The second application execution request 410 is processed as noted above, with the request and augmented TCC 416 being provided by cognitive thread analyzer 332 to the thread consolidation engine 336, which references 417 the policy store database 338 to obtain a best matching policy 418 for the augmented TCC. The policy evaluation results (in this example) in the second request thread also being paused 419 for consolidation with the first request thread. Once the specified threshold is met, a consolidated request thread 420 is generated by the thread consolidation engine, which is forwarded to web application 322. Web application 322 obtains data 421 from (in this example) a database 312, with the data being returned 422 to web application 322. Web application 322 provides a common response, that is, the application response 423, to thread consolidation engine 336. The thread consolidation engine then resumes processing of the paused request threads, which provide responses 424, 425 to cognitive thread analyzer 332. The cognitive thread analyzer 332 may update knowledge store database 334 with the response data 430, as well as forward the application responses 424, 425 to the respective clients 306.

Figure 5:
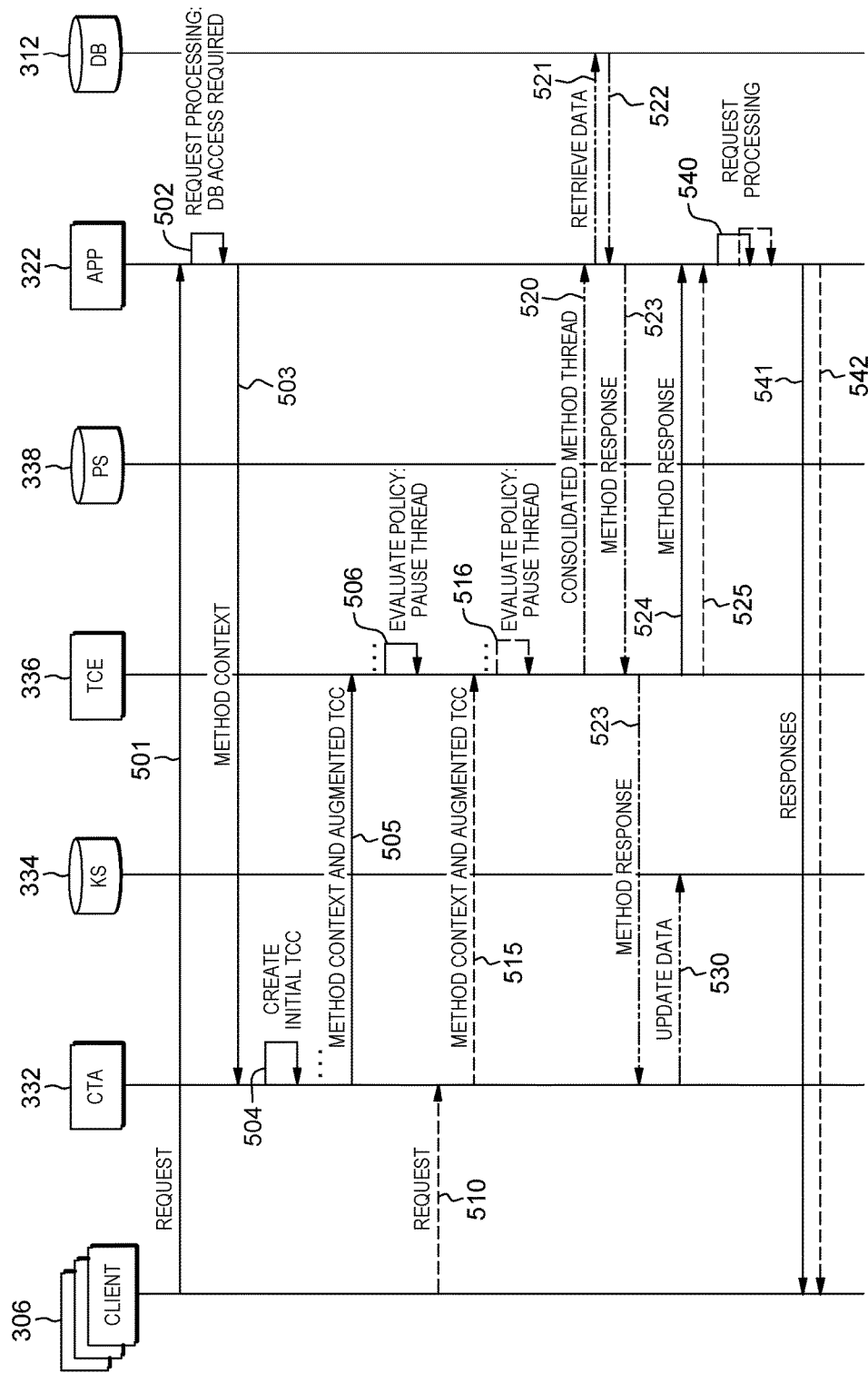
FIG. 5 depicts another embodiment of a cognitive thread management process, in accordance with one or more aspects of the present invention.

FIG. 5 depicts an example processing sequence for method-level thread consolidation, in accordance with one or more aspects of the present invention. As illustrated, an application execution request 501 from a client 306 is passed to web application 322. The web application processes the request, which includes, in one example, a database access 502. This access process may be an example of a method-level thread, such as described herein. The web application 322 provides the method context to the cognitive thread analyzer 332, which creates an initial thread consolidation context (TCC) 504. The initial TCC may be augmented as described above in connection with FIG. 4, with the cognitive thread analyzer 332 referencing the knowledge store database 334 for relevant information. The method context and the augmented TCC 505 are provided by cognitive thread analyzer 332 to thread consolidation engine 336. Thread consolidation engine 336 accesses policy store database 338, such as described above in connection with FIG. 4, and based on a most relevant policy, determines to pause the method-level thread 506.

As illustrated, a second application execution request 510 may be received and processed similar to the first request noted above, with the resultant method context and augmented TCC 515 being provided by cognitive thread analyzer 332 to thread consolidation engine 336. The thread consolidation engine determines, with reference to policy store database 338, the best matching policy (or rule) results in pausing of the second method-level thread 516. Once the specified threshold is met (e.g., number of paused threads reaches the specified threshold or pause time reaches a waiting time threshold), a consolidated method thread 520 is generated by the thread consolidation engine and forwarded to web application 322. Web application 322 references 521 the information in database 312, with a response 522 being provided to the web application 322 resulting in generating a consolidated method response 523. The consolidated method response 523 is provided to thread consolidation engine 336, which forwards the consolidated method response (in this example) to cognitive thread analyzer 332 for use by the analyzer in saving update data 530 in the knowledge store database 334. Additionally, thread consolidation engine 336 provides the respective responses 524, 525 for the resumed method threads to the web application. The web application 332 completes the respective request-level processing 540 and returns respective responses 541, 542, which depending on the requests, may be different responses, with only the sub-process or method having been consolidated in the processing noted above.

Those skilled in the art will note from the above discussion that provided herein are a method, system, and computer program product for executing multiple application threads in, for instance, an application server environment. The process includes, upon receiving an execution request for an application thread: analyzing the application thread to determine resource consumption parameters for the application thread; creating a thread consolidation request context including HTTP request headers and query parameters; generating a record for the application thread in a thread consolidation database, including the thread consolidation request context; comparing the thread consolidation request context with historical thread consolidation request contexts from the thread consolidation database to determine expected performance parameters and additional resource consumption parameters for the application thread; obtaining a thread consolidation policy from a policy store, the thread consolidation policy including one or more rules that determine the parameters of a consolidation of one application thread with other application threads, based on the resource consumption parameters, additional resource consumption parameters, and expected performance parameters; applying the thread consolidation policy to the application thread, wherein the execution time for a consolidated execution of the application thread with other application threads is compared to an execution time of a non-consolidated execution thereof, taking into account a pause time for the application thread; upon the application of the policy leading to a thread consolidation of the application thread with one or more other application threads, pausing the application thread during a pause time while additional application threads are determined to be consolidated with the application thread for execution; creating a consolidated thread for the application thread and the additional application thread(s); executing the consolidated thread; upon completing the consolidated thread processing, passing the result to the paused application thread and the paused additional application threads, the paused application thread and the paused additional application threads being resumed to complete their execution; and updating the thread consolidation database with performance parameters and additional resource consumption parameters of the consolidation thread.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
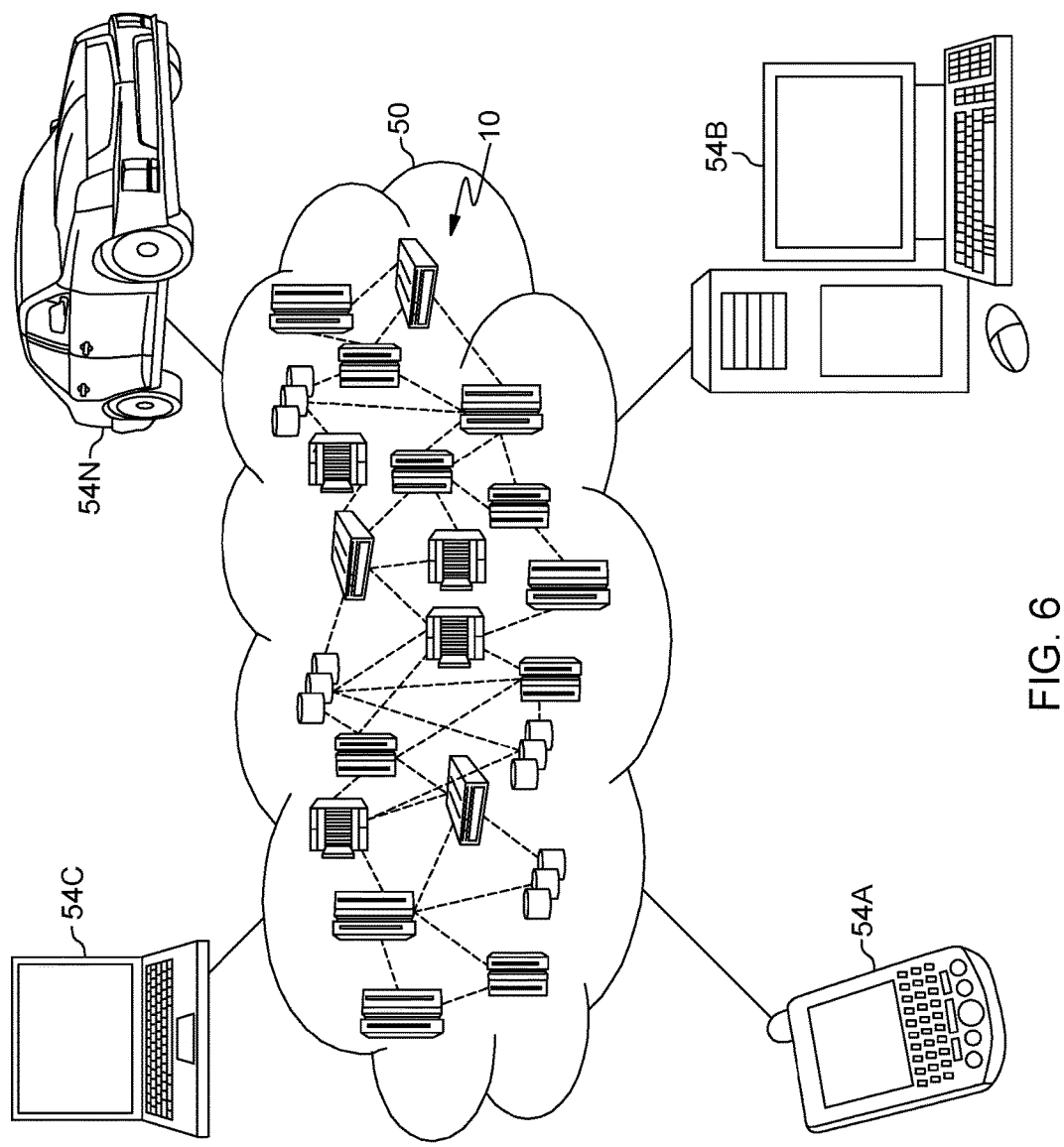
FIG. 6 depicts one embodiment of a cloud computing environment which may facilitate implementing, or be used in association with, one or more aspects of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
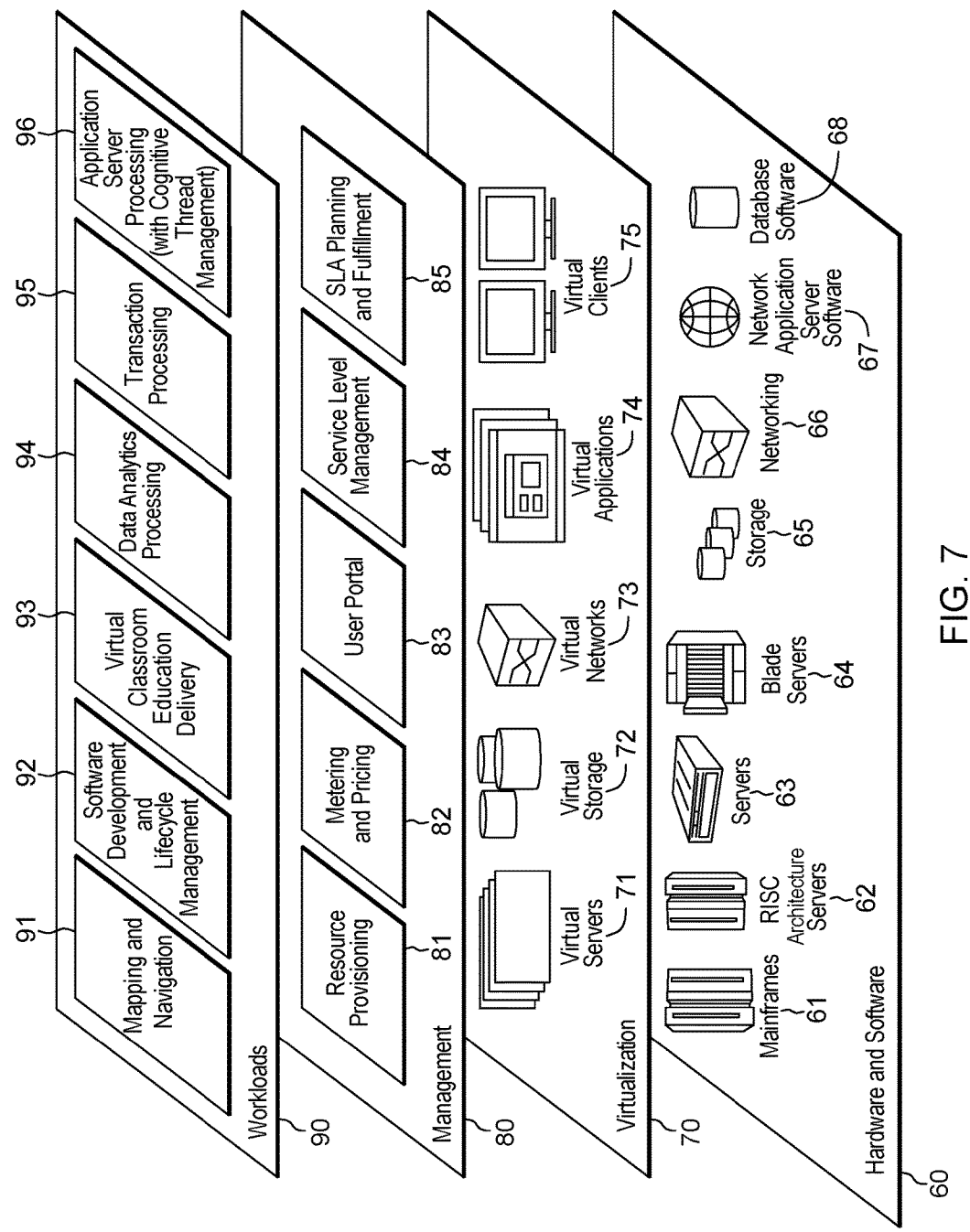
FIG. 7 depicts an example of extraction model layers, which may facilitate implementing cognitive thread management processing, in accordance with one or more aspects of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application server with cognitive thread management processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used, if desired.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for processing application execution requests in an application server environment, the computer program product comprising:
    a computer readable storage medium readable by a processing circuit and storing instructions which, when executed, perform a method comprising:
        obtaining multiple threads based on receiving multiple application execution requests;
        determining whether to consolidate processing of at least two threads of the multiple threads based on one or more specified characteristics related to processing of the at least two threads;
        based on determining to consolidate processing, pausing the at least two threads and generating a consolidated thread to determine a common result for the at least two paused threads; and
        resuming execution of the at least two threads using the common result provided via the consolidated thread.

2. The computer program product of claim 1, wherein the multiple threads comprise multiple request-level threads, and the consolidated thread is a consolidated request-level thread to determine a result for the at least two paused request-level threads.

3. The computer program product of claim 2, wherein the determining whether to consolidate includes:
    analyzing nature of the at least two request-level threads;
    based on the nature of the at least two request-level threads, identifying related performance and resource usage parameters; and
    comparing the identified performance and resource usage parameters against one or more applicable consolidation rules.

4. The computer program product of claim 3, wherein the determining further includes generating a thread consolidation request context for each request-level thread of the at least two request-level threads, each thread consolidation request context including an HTTP request header, and query parameters for the request, and using the knowledge store database, the analyzing comprises augmenting the thread consolidation request context with the related performance and resource usage parameters from the knowledge store database for the request-level thread.

5. The computer program product of claim 4, wherein the determining comprises using, by a thread consolidation engine, each thread consolidation request context to check the policy store database for a best matching thread consolidation rule and based thereon, determining whether the request-level thread qualifies for thread consolidation, and based on qualifying for thread consolidation, pausing the request-level thread to gather one or more additional request-level threads with context matching that of the paused request-level thread.

6. The computer program product of claim 5, wherein the policy store database contains consolidation rules for consolidating request-level threads based on specific characteristics related to processing of the request-level threads.

7. The computer program product of claim 1, wherein the multiple threads comprise multiple method-level threads, and the consolidated thread is a consolidated method-level thread to determine a result for the at least two paused method-level threads, wherein based on receiving the multiple application execution requests, multiple request-level threads are generated, each request-level thread spawning multiple method-level threads.

8. The computer program product of claim 7, wherein the determining includes generating a thread consolidation method context for each method-level thread of the at least two method-level threads, each thread consolidation method context including a method signature, and one or more method arguments, and using a knowledge store database, the analyzing comprises augmenting the thread consolidation method context with related performance and resource usage parameters from the knowledge store database for the method-level thread.

9. The computer program product of claim 8, wherein the determining comprises using, by a thread consolidation engine, the thread consolidation method context to check a policy store database for a best matching thread consolidation rule and based thereon, determining whether the method-level thread qualifies for thread consolidation, and based on qualifying for thread consolidation, pausing the method-level thread to gather one or more additional method-level threads with context matching that of the paused method-level thread.

10. The computer program product of claim 9, wherein the policy store database contains consolidation rules for consolidation of method-level threads based on specific characteristics related to processing of the method-level threads.

11. The computer program product of claim 1, wherein the determining whether to consolidate processing of the at least two threads includes evaluating, by a cognitive thread analyzer, a respective thread consolidation context for each thread of the at least two threads, and wherein the respective thread consolidation context is augmented based on historical thread consolidation information.

12. The computer program product of claim 1, wherein the determining whether to consolidate processing of the at least two threads includes determining that consolidating the at least two threads will meet a specified consolidation goal.

13. A system for processing application execution requests in an application server environment, the system comprising:
  a memory; and
  a processing circuit communicatively coupled with the memory, wherein the system performs a method comprising:
    obtaining multiple threads based on receiving multiple application execution requests;
    determining whether to consolidate processing of at least two threads of the multiple threads based on one or more specified characteristics related to processing of the at least two threads;
    based on determining to consolidate processing, pausing the at least two threads and generating a consolidated thread to determine a common result for the at least two paused threads; and
    resuming execution of the at least two threads using the common result provided via the consolidated thread.

14. The system of claim 13, wherein the multiple threads comprise multiple request-level threads, and the consolidated thread is a consolidated request-level thread to determine a result for the at least two paused request-level threads.

15. The system of claim 13, wherein the multiple threads comprise multiple method-level threads, and the consolidated thread is a consolidated method-level thread to determine a result for the at least two paused method-level threads, wherein based on receiving the multiple application execution requests, multiple request-level threads are generated, each request-level thread spawning multiple method-level threads.

16. The system of claim 13, wherein the determining whether to consolidate processing of the at least two threads includes evaluating, by a cognitive thread analyzer, a respective thread consolidation context for each thread of the at least two threads, and wherein the respective thread consolidation context is augmented based on historical thread consolidation information.

17. The system of claim 13, wherein the determining whether to consolidate processing of the at least two threads includes determining that consolidating the at least two threads will meet a specified consolidation goal.

18. A computer-implemented method of processing application execution requests in an application server environment, the computer-implemented method comprising:
  obtaining multiple threads based on receiving multiple application execution requests;
  determining whether to consolidate processing of at least two threads of the multiple threads based on one or more specified characteristics related to processing of the at least two threads;
  based on determining to consolidate processing, pausing the at least two threads and generating a consolidated thread to determine a common result for the at least two paused threads; and
  resuming execution of the at least two threads using the common result provided via the consolidated thread.

19. The computer-implemented method of claim 18, wherein the determining whether to consolidate processing of the at least two threads includes evaluating, by a cognitive thread analyzer, a respective thread consolidation context for each thread of the at least two threads, and wherein the respective thread consolidation context is augmented based on historical thread consolidation information.

20. The computer-implemented method of claim 18, wherein the determining whether to consolidate processing of the at least two threads includes determining that consolidating the at least two threads will meet a specified consolidation goal.

* * * * *